United States Patent [19]

Izumine

[11] Patent Number: 4,821,848
[45] Date of Patent: Apr. 18, 1989

[54] BRAKE DISK

[75] Inventor: Zenzo Izumine, Hamamatsu, Japan

[73] Assignee: Yutaka Giken Co., Ltd., Shizuoka, Japan

[21] Appl. No.: 181,633

[22] Filed: Apr. 14, 1988

[30] Foreign Application Priority Data

Apr. 15, 1987 [JP] Japan .................................. 57-90668

[51] Int. Cl.$^4$ ............................................. F16D 65/12
[52] U.S. Cl. ............................ 188/218 XL; 188/73.2; 192/70.16
[58] Field of Search ............. 192/70.16, 107 R, 106.1, 192/70.17, 70.13, 70.14; 188/218 XL, 218 A, 218 R, 73.2, 73.1, 205, 206

[56] References Cited

U.S. PATENT DOCUMENTS

| 3,295,641 | 1/1967 | Eaton et al. ................... 188/218 XL |
| 3,933,228 | 1/1976 | Otto et al. ..................... 188/218 XL |
| 4,147,240 | 4/1979 | Kleil et al. .................... 192/70 G X |
| 4,597,486 | 7/1986 | Kabayama ............... 188/218 XL X |
| 4,645,041 | 2/1987 | Bass ............................. 188/218 XL |
| 4,662,482 | 5/1987 | Bass ......................... 188/218 XL X |

FOREIGN PATENT DOCUMENTS

| 2550893 | 5/1977 | Fed. Rep. of Germany ...... 188/218 XL |
| 0140577 | 3/1980 | Fed. Rep. of Germany ...... 188/218 XL |
| 60-3333 | 1/1985 | Japan . |
| 0241538 | 10/1986 | Japan ............................ 188/218 XL |
| 1080035 | 8/1967 | United Kingdom ......... 188/218 XL |

Primary Examiner—Douglas C. Butler
Attorney, Agent, or Firm—Michael N. Meller

[57] ABSTRACT

A brake disk has a ring-shaped braking section with plural inner circumferential spokes, a hub section with plural outer circumferential spokes, a dish-shaped spring so placed on the same side surfaces of a pair of the plurality of spokes as to be in pressure contact commonly therewith, and a connecting pin used with the spring to connect the paired spokes and disposed to allow both of the paired spokes to move relatively slightly with respect to each other. One spoke is provided on a surface of its end portion thereof with a circumferential groove and the other paired spoke is provided on a surface of its end portion with a circumferential ridge. The ridge is loosely inserted in the groove when assembled. The dimension of the ridge is such that a small play exists in both the axial and radial directions when the ridge is inserted in the groove. Concave recesses are arranged in the end portions of the paired spokes in opposition, forming a hook for receiving a pin for restricting axial relative displacement of the hub and braking sections.

8 Claims, 3 Drawing Sheets

BRAKE DISK

FIELD OF THE INVENTION

This invention relates to a floating type brake disk used in a disk brake for a motor vehicle.

BACKGROUND OF THE INVENTION

In a floating type brake disk a braking section and a hub section are each a separate unit and are connected to each other so that even when the braking section becomes thermally expanded with heat produced by friction of a brake pad with application of a braking force, such thermal expansion is confined only to the braking section and, on top of that, since the braking section is of a simple ring shape and not bound by the hub section, it does not cause any significant distortion to a brake surface, thus bringing about an advantage that the braking action remains consistent.

In a brake disk of this type, is was usual that a measure of having a dish-shaped spring put in pressure contact with the side surface of each of both sections was taken in order to restrict a relative movement in the axial direction of both the braking section and the hub section with respect to each other and to prevent noise that could result from loosneing of the two sections. (Jikkai Sho 60-3333 is one example thereof.)

In the foregoing prior art, it was necessary to use a dish-shaped spring having a greater spring constant and durability because the load making both the braking section and the hub section move relatively in the axial direction should be supported by resilience of the dish-shaped spring.

BRIEF SUMMARY OF THE INVENTION

According to this invention, means provided to solve the foregoing problems is such that movement relative to each other of the braking section and the hub section is controlled not only by the dish-shaped spring but also by having both sections engaged in part with each other so as to avoid the dish-shaped spring having an excessive load applied thereto. More specifically, in a brake disk of the type that a rim-shaped braking section has plural inner circumferential spokes provided at its inner circumferential surface, a hub section connected to an axle is provided with plural outer circumferential spokes, a dish-shaped spring is so placed on the same side surfaces of paired two inner and outer circumferential spokes as to be in pressure contact commonly therewith, and a connecting pin used together with the dish-shaped spring to connect the paired two spokes is so disposed as to allow both of the paired two spokes to move relatively slightly with respect to each other, said means of the present invention is characterized in that each spoke of the pair is provided on a surface of the end portion thereof facing that of the other one with either a peripheral groove or a ridge, both of which are so arranged as to fit with each other in a floating manner, and further with a recess or cavity so arranged as to face the other one opposite thereto and together hold in place the connecting pin linked with the dish-shaped spring.

According to the foregoing means, a backlash or improper engagement at the joint of the braking section with the hub section is effectively checked by the dish-shaped springs so that no noise may be generated and, if a thrust in the axial direction exceeding the resilience of the dish-shaped spring is applied, the peripheral groove and the ridge will become engaged with each other to check the relative movement thereof.

BRIEF DESCRIPTION OF THE DRAWINGS

The preferred embodiment of the invention will be described in detail with reference to the drawings, wherein.

DETAILED DESCRIPTION OF THE PREFERRED EMBODIMENT

Figure 1:
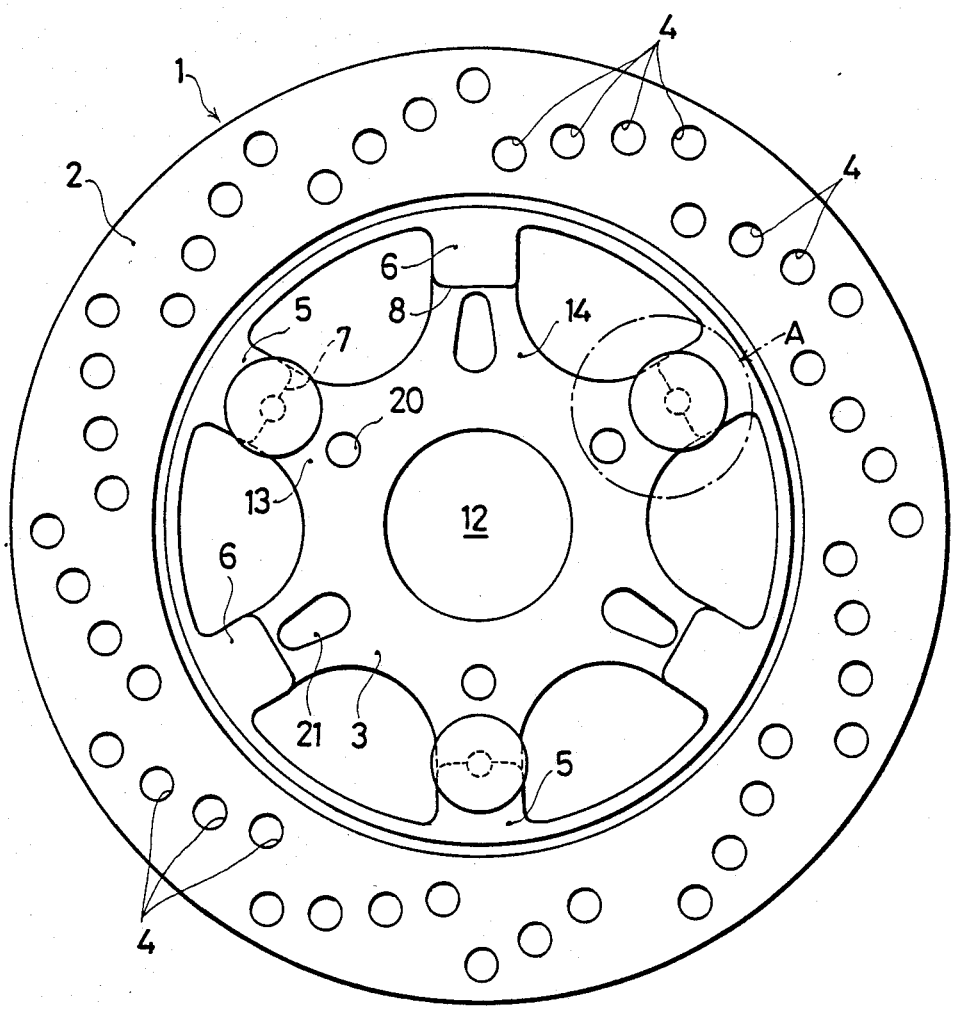
FIG. 1 is a front view of the preferred embodiment of the invention.
Figure 2:
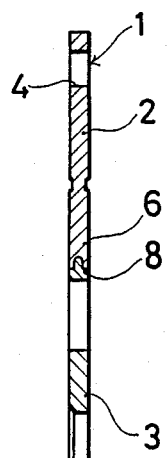
FIG. 2 is a sectional side view thereof.
Figure 3A:
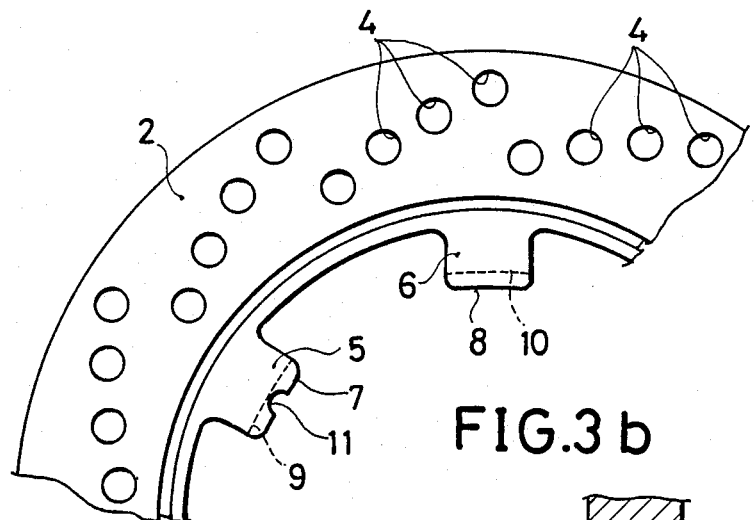
FIG. 3a is a partial front view of a braking section thereof.
Figure 3B:
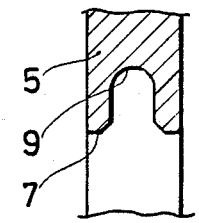
FIG. 3b is a sectional partial side view of a braking section thereof.

Referring to the drawings, reference numeral 1 generally denotes a brake disk, reference numeral 2 denotes a braking section thereof, and reference numeral 3 denotes a hub for mounting on an axle. The braking section 2 is ring-shaped and has vent holes 4 and a plurality of short radially inwardly directed spokes 5,6 distributed alternatingly at equal intervals along the inner circumference of the braking section. Peripheral grooves 9, 10 that run in the circumferential direction are provided on inner end surfaces 7, 8 of spokes 5,6 while a semi-circular axially directed concave recess 11 for interconnection is provided only on spoke 5, as shown in FIGS. 3a and 3b.

Figure 4A:
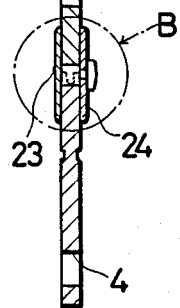
FIG. 4a is a partial front view of a hub section thereof.
Figure 4A:
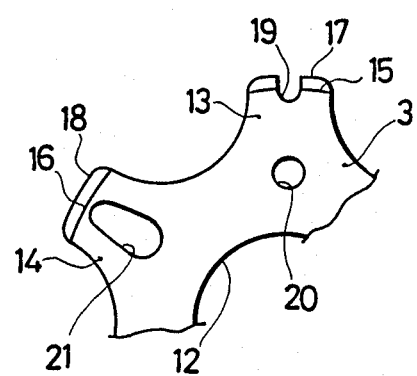
Figure 4B:
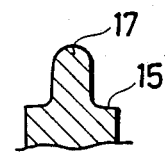
FIG. 4b is a sectional partial side view of a hub section thereof.
Figure 5:
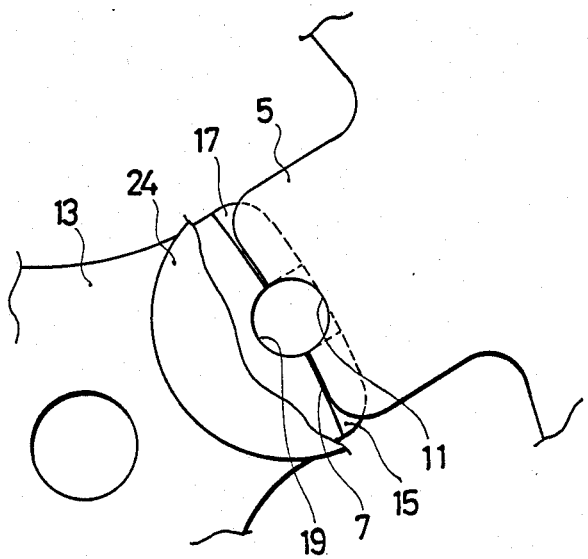
FIG. 5 is an enlarged view of portion A in FIG. 1.

The hub section has an axle hole 12 at its center and radially outwardly directed spokes 13, 14 on its outer circumference. The spokes 13, 14 have peripheral ridges 17, 18 projecting from outer end surfaces 15, 16 thereof, as shown in FIGS. 4a and 4b. The dimensions of the ridges 17, 18 are such that a small play exists in both the axial and radial directions when the ridge is inserted in the corresponding one of the circumferential grooves 9, 10. In addition, each spoke 13 is provided with a U-shaped axially directed concave recess 19 for interconnection. Again referring to the drawings, reference numeral 20 denotes a mounting hole used to mount the brake disk 1 onto the axle, whereas reference numerl 21 denotes an opening provided for the purpose of decoration.

Figure 6:
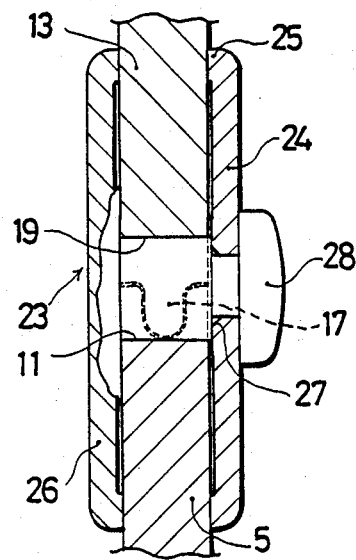
FIG. 6 is an enlarged view of portion B in FIG. 2.

For connecting the braking section 2 and the hub section 3 to each other, they are first concentrically positioned but out of phase in terms of their rotatational angle, and then either of sections 2, 3 is rotated until the ridges 17, 18 respectively engage the circumferential grooves 9, 10 in such a manner that the concave recesses 11, 19 overlap. As shown in FIG. 6, the braking section 2 and the hub section 3 are held in place by means of a connecting pin 23 inserted in recesses 11, 19 and the dish-shaped spring 24.

The dish-shaped spring 24 has a thick stepped portion 25 on its periphery and is dish-shaped, whereas pin 23 has a head portion 26, a stepped portion 27, and a caulking portion 28 by which the dish-shaped spring 24 is secured in place. The head portion of the pin 23 in accordance with the preferred embodiment has the same shape as the dish-shaped spring 24 so as to make it resilient. Alternatively, the pin can also be shaped so as to be rigid rather than resilient if so desired.

The braking section 2 and the hub section 3 transmit a braking torque through the pin 23 while movement in the axial direction is restricted by the circumferential grooves, 9, 10 and the ridges 17, 18 to such an extent that there may be only slight play. And both of spokes 5, 13 are provided on their side surfaces with the dish-shaped spring which is in pressure contact therewith, so that any clattering noise generated due to a clearance formed in the turning, radial and axial directions of each component member may be prevented by the frictional force of the dish-shaped spring 24 and so that movement in the axial direction of the braking section which can be caused by external force applied at the time of brake application may be absorbed by flexion of the dish-shaped spring 24. Additionally, since the braking section and the hub section are separate from each other, thermal deformation of the braking section 2 is allowed to take place freely, thereby preventing distortion of the braking surface.

Furthermore, when relative movement of the braking section and the hub section becomes unduly large, the circumferential grooves 9, 10 and the side surfaces of the ridges 17, 18 contact each other to prevent any further movement, whereby no undue load is applied to the dish-shaped spring 24.

In the preferred embodiment, only every other pair of the spokes, that is, 5 and 13, receives the pin 23, but in the alternative, each pair of spokes, including spokes 6, 14, may be provided with recesses for receiving a pin, if desired. In yet another arrangement, each pair of spokes 6, 14 not provided with pin 23 may be eliminated if the hub is for use in a lightweight motor vehicle.

As described in the foregoing, the braking section and the hub section according to the preferred embodiment of the invention are provided respectively with circumferential grooves and ridges which are arranged to receive or absorb undue external forces, whereby the dish-shaped spring will not be damaged by external forces or rendered inoperative.

What is claimed is:

1. A brake disk comprising:
    a ring-shaped braking section having plural inner circumferential spokes provided on its inner circumferential surface;
    a hub section connected to an axle provided with plural outer circumferential spokes;
    a dish-shaped spring placed on the same surfaces of paired two inner and outer circumferential spokes as to be in pressure contact commonly therewith, and
    a connecting pin used together with said dish-shaped spring to connect said paired two spokes is disposed as to allow both of said paired two spokes to move relatively slightly with respect to each other, wherein one spoke of the pair is provided on a surface of the end portion thereof facing a surface of the end portion of the other spoke with a peripheral groove and the other spoke of the pair is provided on said surface of the end portion thereof with a peripheral ridge, and said end portions of both spokes are each provided with a concave recess, said concave recesses being arranged to face each other and cooperate to hold in place said connecting pin linked with said dish-shaped spring when said brake disk is in an assembled state, and wherein said groove and said ridge extend circumferentially, said groove being shaped to receive said ridge with small play in the axial direction when said brake disk is in said assembled state, and wherein one of said concave recesses forms a discontinuity in said ridge and the other of said concave recesses intersects said groove.

2. A brake disk as claimed in claim 1, wherein said dish-shaped spring has a thick stepped portion on its periphery.

3. A brake disk as claimed in claim 2, wherein said connecting pin has a head portion, a stepped portion and a caulking portion.

4. A brake disk as claimed in claim 3, wherein said head portion of said connecting pin is formed in the shape of said dish-shaped spring.

5. A bake disk comprising:
    a ring-shaped braking section having a plurality of radially inwardly directed spokes distributed along its inner circumferential surface,
    a hub section for mounting on an axle and having a plurality of radially outwardly directed spokes distributed to abut corresponding spokes of said braking section to form pairs,
    a plurality of dish-shaped springs, each spring being arranged to be in pressure contact with the same side surfaces of paired spokes, and
    a plurality of connecting pins, each pin being coupled to a corresponding dish-shaped spring for connecting paired spokes, whereby said paired spokes are relatively movable with small play, one spoke of each pair has a peripheral groove formed in its end surface and the other spoke of each pair has a peripheral ridge formed on its end surface, said groove and ridge each extending in a circumferential direction and being coupled by form fitting with small play, and each end surface of both spokes of at least one of said pairs has an axial concave recess formed therein, said recesses being arranged to form a through-hole for receiving a corresponding connecting pin, wherein one of said concave recesses forms a discontinuity in said ridge and the other of said concave recesses intersects said groove.

6. A brake disk as claimed in claim 5, wherein said each dish-shaped spring has a thick stepped portion on its periphery.

7. A brake disk as claimed in claim 6, wherein said each connecting pin has a head portion, a stepped portion and a caulking portion.

8. A brake disk as claimed in claim 7, wherein said head portion of said connecting pin is formed in the shape of said dish-shaped spring.

* * * * *

UNITED STATES PATENT AND TRADEMARK OFFICE
CERTIFICATE OF CORRECTION

PATENT NO. : 4,821,848
DATED : Apr. 18, 1989
INVENTOR(S) : Zenzo Izumine

It is certified that error appears in the above-identified patent and that said Letters Patent is hereby corrected as shown below:

On the Title Page, Item [30]   Foreign Application Priority Data
"Apr. 15, 1987 [JP]  Japan ............57-90668" should read
--Apr. 15, 1987 [JP]  Japan ............62-09668--.

Signed and Sealed this

Nineteenth Day of September, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,821,848
DATED     : Apr. 18, 1989
INVENTOR(S) : Zenzo Izumine

It is certified that error appears in the above-identified patent and that said Letters Patent is hereby corrected as shown below:

On the Title Page, Item [30]   Foreign Application Priority Data

"Apr. 15, 1987 [JP]   Japan ............57-90668" should read

--Apr. 15, 1987 [JP]   Japan ............62-90668.

This certificate supersedes Certificate of Correction issued September 19, 1989.

Signed and Sealed this

Fifteenth Day of May, 1990

Attest:

HARRY F. MANBECK, JR.

Attesting Officer         Commissioner of Patents and Trademarks